United States Patent
Maaren et al.

(10) Patent No.: US 8,282,029 B2
(45) Date of Patent: Oct. 9, 2012

(54) SYSTEM, METHOD AND APPARATUS FOR PROCESSING BONE PRODUCT

(76) Inventors: Jeroen Maaren, Edenvale (ZA); Wynand Maaren, Edenvale (ZA); Charles Booysen, Potgietersrus (ZA)

(*) Notice: Subject to any disclaimer, the term of this patent is extended or adjusted under 35 U.S.C. 154(b) by 0 days.

(21) Appl. No.: 12/671,381

(22) PCT Filed: Jul. 30, 2008

(86) PCT No.: PCT/IB2008/053068
§ 371 (c)(1), (2), (4) Date: Jan. 29, 2010

(87) PCT Pub. No.: WO2009/016599
PCT Pub. Date: Feb. 5, 2009

(65) Prior Publication Data
US 2010/0200682 A1 Aug. 12, 2010

(30) Foreign Application Priority Data
Jul. 31, 2007 (ZA) .................................. 2007/06317

(51) Int. Cl.
*B02C 4/30* (2006.01)

(52) U.S. Cl. .................. 241/101.2; 241/152.2; 241/159; 241/235

(58) Field of Classification Search ................... 241/30, 241/29, 101.2, 82.1–82.5, 152.2, 159, 235
See application file for complete search history.

(56) References Cited

U.S. PATENT DOCUMENTS

| | | | |
|---|---|---|---|
| 3,345,041 A | 10/1967 | Van der Schee | |
| 4,023,735 A * | 5/1977 | Schnell | 241/22 |
| 4,252,282 A | 2/1981 | Vermeulen et al. | |
| 5,927,627 A | 7/1999 | Edson et al. | |
| 6,722,593 B1 | 4/2004 | Dobozy | |
| 7,588,206 B2 * | 9/2009 | Hausman et al. | 241/235 |
| 2005/0205701 A1 | 9/2005 | Hausman et al. | |

FOREIGN PATENT DOCUMENTS
CA 951062 A1 7/1974
* cited by examiner

*Primary Examiner* — Mark Rosenbaum
(74) *Attorney, Agent, or Firm* — Charter IP LLC; Matthew J. Lattig

(57) ABSTRACT

The invention discloses a system for processing bone product comprising at least a mincer and a comminuter (10), a method to operate such a system and a comminuter (10) for use in such a system and method.

18 Claims, 10 Drawing Sheets

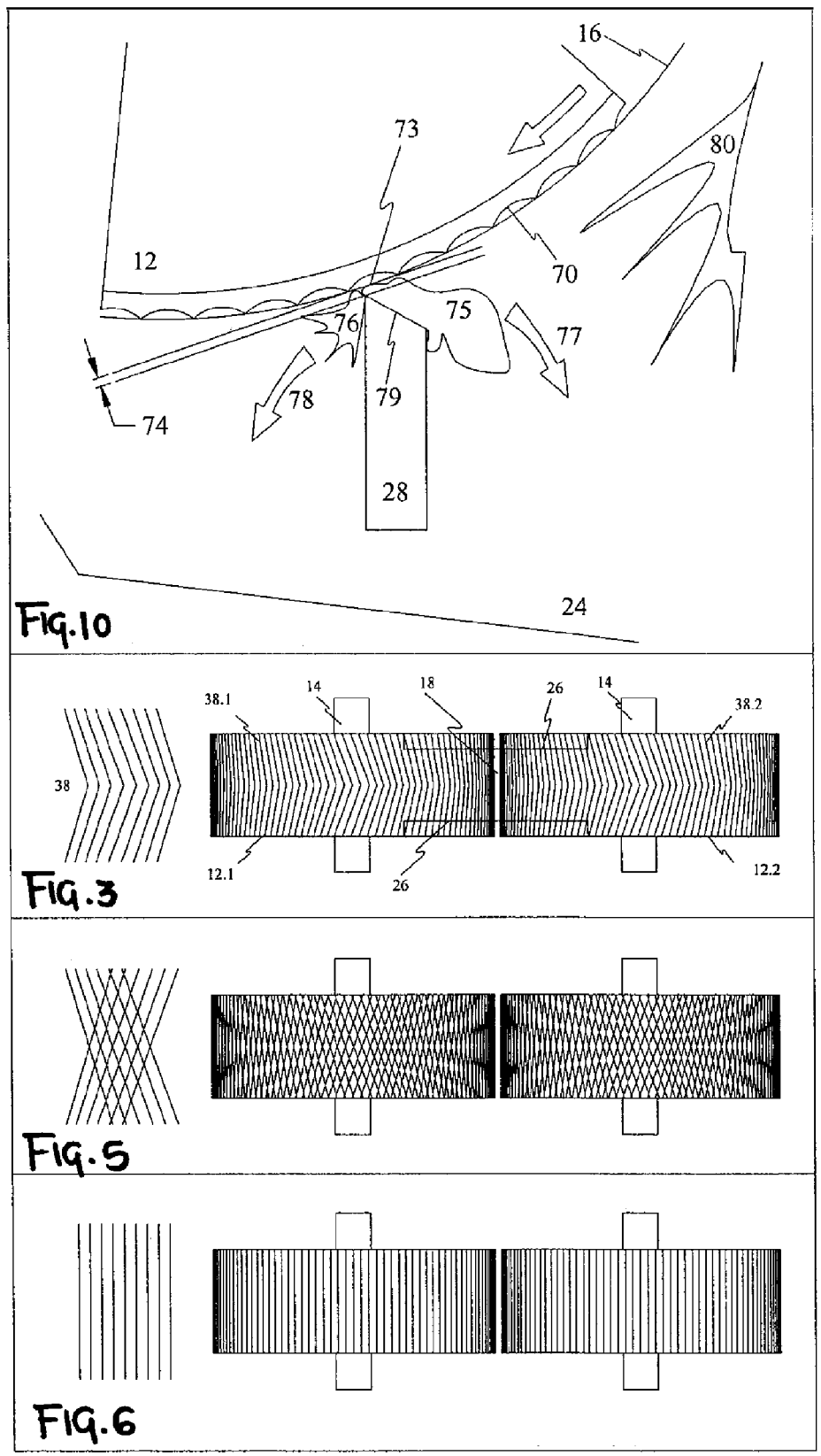

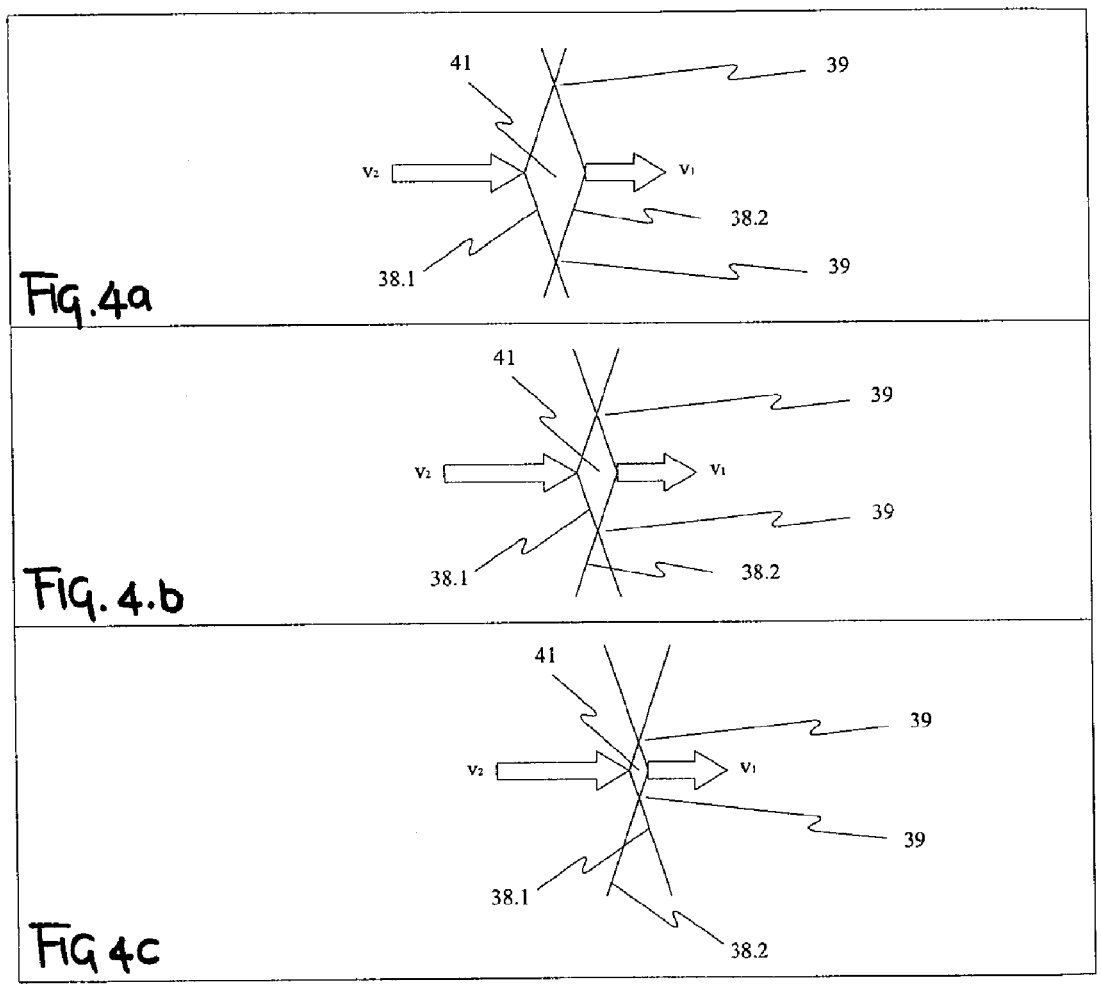

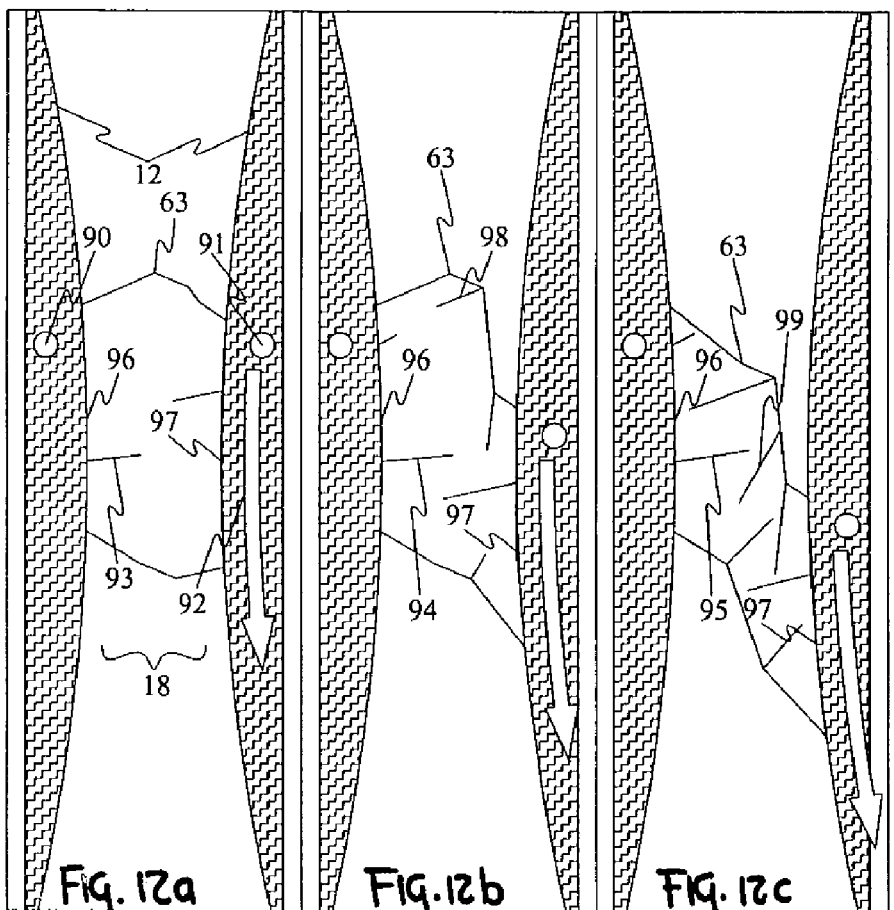
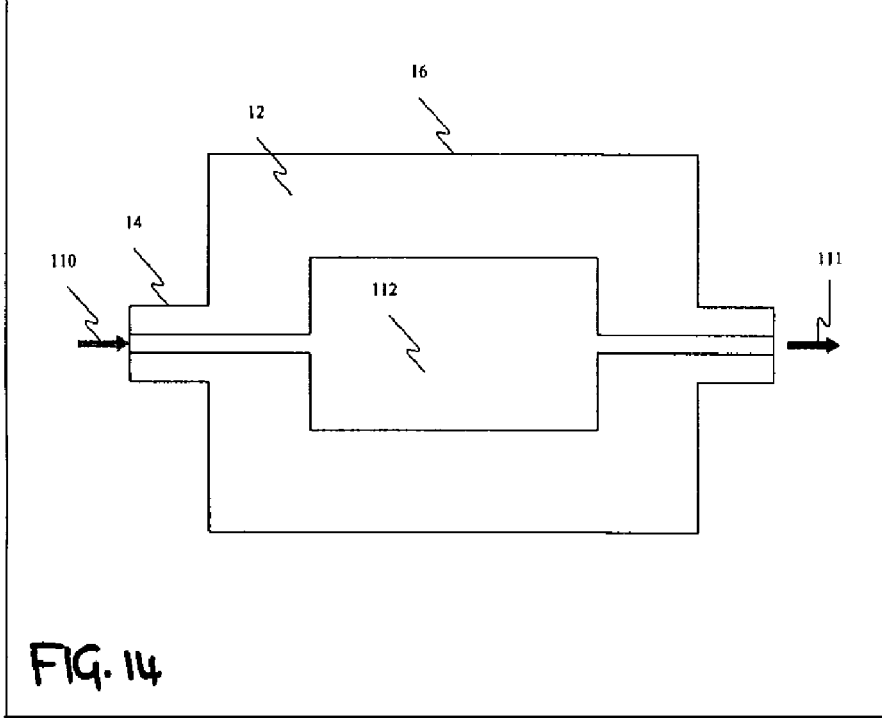

SYSTEM, METHOD AND APPARATUS FOR PROCESSING BONE PRODUCT

FIELD OF THE INVENTION

This invention relates to a method and system for processing a commercially exploited livestock bone product into a foodstuff and to an apparatus for use in the method.

BACKGROUND TO THE INVENTION

In many countries, thousands of cattle, sheep, pigs, poultry and marine animals, hereafter called commercially exploited livestock, are slaughtered daily for human consumption. In some cases, a carcass is stripped of its meat mechanically to yield what is known as "mechanically deboned meat" (MDM). Alternatively, the meat may be stripped from the carcass by hand. In either case, a low value product remains after stripping a carcass of its meat that comprises mainly bone but includes also bone marrow and residual pieces of meat, fat, and sinew. Such a low value product will be referred to herein as a commercially exploited livestock bone product or simply a bone product.

In this specification reference is made to a particle size of a product. The particle size of a product is the diameter of the smallest round hole, defined through a plate, through which the product will pass.

In this specification reference is also made to a gap defined between two opposing circumferential surfaces of two rollers. The size of the gap is defined at opposing circumferential positions on circumferential surfaces of the rollers where the surfaces are nearest each other and is particularly the size of the gap between swept paths of the surfaces during rotation of the rollers. The average size of the gap is the average size in the transverse direction of the circumferential surfaces.

OBJECT OF THE INVENTION

It is an object of the invention to provide a system, method for processing a bone product into a foodstuff and to provide an apparatus for processing such a bone product into a comminuted paste.

SUMMARY OF THE INVENTION

In accordance with this invention there is provided a system for processing bone product comprising at least a mincer and a comminuter, the mincer configured to receive and mince bone product and the comminuter configured to receive minced bone product from the mincer and comminute it to a size of less than 0.4 mm, preferably to a size between about 0.4 mm and 0.02 mm, and more preferably to a size between 0.1 mm and 0.02 mm.

There is also provided for the system to including cooling means at least between the mincer and comminuter, and preferably cooling means before both the mincer and comminuter.

There is also provided for the system to include an emulsifier before, alternatively after, the comminuter.

In an alternative embodiment of the invention there is provided a system for processing bone product comprising at least a comminuter and an emulsifier.

In accordance with a further aspect of the invention there is provided comminution apparatus for bone product comprising a pair of rigid rollers rotatably located in respect of each other, each roller defining a circumferential surface in a configuration in which the surfaces oppose each other and define a gap between them having an average size less than 25 mm, and drive means for rotationally driving at least one of the rollers.

There is further provided the non-driven roller to be, in use, indirectly counter-rotationally driven via frictional contact with particles driven through the gap between the rollers by the directly rotationally driven roller, alternatively for the drive means to rotationally drive both rollers, preferably counter-rotating them, and more preferably at different rotational speeds, alternatively at different tangential velocities of their circumferential surfaces.

There is also provided for the average size of the gap to be adjusted, alternatively adjustable, to suit the size and fibrous nature of the bone product being comminuted, preferably to within the range of 0.02 mm to 25 mm, more preferably to below 0.4 mm, and still more preferably to within the range 0.02 mm to 0.1 mm.

According to a further feature of the invention there is provided for the circumferential surfaces of the rollers to be at least substantially round cylindrical; and for the rotational axes of the rollers to be parallel to each other.

According to a yet further feature of the invention there is provided for the circumferential surface of at least one of the rollers to have surface texturing, preferably being the result of a manufacturing process which gives texture or a particular texture affecting the visual and especially tactile quality of the roller surface, the texturing having as a primary consequence a certain roller surface roughness, influencing the coefficient of friction between the roller surface and the bone product.

There is further provided for the surface texturing to not significantly affect the overall geometric relationship between the rollers, relative to the tangential included angle between the rollers at a contact point between a particle and said rollers, and preferably for the surface texturing to have a depth in the range 30 μm to 100 μm.

There is still further provided for the circumferential surfaces of the rollers have similar texturing, in the form of a series of circumferentially spaced criss-cross shallow grooves or knurling, alternatively in the form of a series of circumferentially spaced transverse straight shallow grooves between axially aligned flat areas of the opposing rollers.

There is also provided for the one roller, operatively being driven by the drive means at a higher tangential velocity of its circumferential surface than the other, to include surface texturing in the form of a series of circumferentially spaced chevrons pointing in their own trailing direction during operative rotation of the roller; and for the other roller to include surface texturing in the form of a series of circumferentially spaced chevrons pointing in their own leading direction during operative rotation of the roller.

There is further provided for both rollers, operatively being driven at different tangential velocities of their circumferential surfaces, to have similar texturing on their roller surfaces in the form of a series of circumferentially spaced shallow tubular grooves of which the axial direction is oriented in the general direction of each roller axis and is parallel to the centroid axis of the gap length.

According to a still further feature of the invention the apparatus is configured such that the following applies to a circumferential surface with surface texturing of at least one of the rollers:

$\mu >= \mu_{needed}$, where $\mu_{needed} = \mathrm{Tan}(2*\theta)$, and $\theta = \mathrm{Cos}^{-1}\{[R-((a-d)/2)]/R\}$ in which R=Minimum roller radius; in mm
a=Minimum gap between the roller surfaces; in mm
d=Maximum particle size, as defined; in mm
θ=Maximum included half-angle between two tangential lines to the roller surfaces at the points of contact; in °; and
$\mu_{needed}$=Smallest coefficient of friction between the rollers needed to pull the particle into the gap; as a dimensionless quantity.

According to a further feature of the invention there is provided for the circumferential surface of at least one of the rollers to have surface shaping, being the result of any manufacturing process serving to define the shape of the roller surfaces with the express purpose of directly causing a geometric reduction in the included contact angle between the tangential contact lines between said roller shaping surfaces or between the tangential contact lines between one roller shape and another roller's textured surface, and preferably for the shaping to have depth exceeding 50 μm.

There is further provided for the surface shaping to be applied in the form of transverse grooves, alternatively in the form of semi-spherical dimples, preferably for the surface shaping to be applied smoothly to eliminate sharp recessed corners or pockets on the surface.

There is also provided for the apparatus to be configured such that the following applies to a circumferential surface with surface shaping of at least one of the rollers:

$\mu \gtrsim \mu_{needed}$ $t_r \approx t$, which is approximately true for $r << R$ $E_\% \leq \{[r/(2*R)]*[1-(t/r)]\}*100$ $\beta \approx \cos^{-1}((r-t)/r)$ $S_R \approx 2*r*\sin\beta$ $\alpha \approx S_R/(2*R)$ $\gamma = \cos^{-1}\{[R-((d-a)/2)]/R\}$ $\theta \approx \gamma - \alpha - \beta$ $\mu_{needed} \approx \tan(2*\theta)$ $N \leq (\pi*R)/\{[r^2-(r-t)^2]^{1/2}\}$; $N \in$ Integers In which $E_\%$=Maximum error between calculated approximation and the geometrical exact solution; %
R=Minimum outer roller radius; in a range R≧150 mm
a=Minimum gap between the roller surfaces; in a range ϵ[0.02 to 0.4] mm
d=Maximum particle size, as defined [64]; in a range ϵ[2 to 25] mm
r=Radius of the surface dimple shape [73]; in a range ϵ[2 to 20] mm
t=Dimple depth, as measured from the bottom of the trough of the dimple to the middle of the segment removed from the roller surface by the dimple [74]; in a range ϵ[0.05 to 0.5] mm
β=Angle between roller and dimple centroid line and the line from the dimple centre to the point of contact; in °
$S_R$=Roller segment length removed by the dimple; in mm
α=Angle between roller and dimple centroid line and the line from the point of contact to the roller centroid; Calculated in Rad, then converted to °
γ=Geometric angle between the line connecting the contact point to the roller centroid and the line connecting the two centroids of the two rollers; °
θ=Maximum included half-angle between two tangential lines to the roller surfaces at the points of contact; °

$\mu_{needed}$=Smallest coefficient of friction needed between the rollers and the particle; in a range ϵ[0.002 to 0.35], a dimensionless quantity; and
N=nominal quantity of dimples that can be equally spaced around the radial circumference of the roller and must be an element from the integer set of numbers; in a range ϵ integers.

There is still further provided for the apparatus to be configured such that the average size of the gap is small enough in relation to the diametric size of fibres in the bone product to break the bone product down to loosely connected fibres which are separated at a microscopic level.

According to a yet further feature of the invention at least one of the rollers includes proximity scraping means in the form of at least one body defining an edge closely spaced to the circumferential surface of the roller for removing comminuted material from the surface after the material has passed through the gap, and preferably for the spacing between the edge of the body and the circumferential surface of the roller is between 0.1 mm and 0.5 mm.

There is yet further provided for the apparatus to include cooling means for at least the circumferential surface of at least one of the rollers, preferably both of the rollers.

According to a further feature of the invention there is provided for the apparatus to include a third roller and a passage; in which the third roller defines a circumferential surface and is rotatably mounted to rotate about a rotational axis; the circumferential surface of the third roller opposes the circumferential surface of one of the first and second rollers and these surfaces define between them a gap having an average size smaller than that of the gap defined between the first and second rollers; and the passage is configured to operatively channel product that has passed through the gap between the first and second rollers into the gap defined between the third roller and the said one of the first and second rollers.

According to a further aspect of the invention there is provided a method of processing bone product by making use of the system and apparatus defined above.

BRIEF DESCRIPTION OF THE DRAWINGS

A preferred embodiment of the invention is described by way of example only and with reference to the accompanying drawings in which:

FIG. 3 shows a plan view of a pair of rollers of the apparatus of FIG. 2 having a surface texture applied to them, in accordance with the fourth aspect of the invention;

FIGS. 4a to c show certain aspects of relative displacement of the surface textures of FIG. 3;

FIGS. 5 and 6 show alternative embodiment rollers having alternative surface textures to that of FIG. 3;

FIG. 9 also shows the dimple effect of FIG. 8 more completely;

FIG. 10 shows the mechanism of the sixth aspect of the invention, where accumulated comminuted material on the scraper landing removes the comminuted material from the roller. It also show the spawling from material passing through the gap between the rollers of the comminution apparatus and spawling after the proximity scraper, which both assist in passing the comminuted material through the comminution apparatus;

FIGS. 12a to c show a detail of parts of the rollers of a comminution apparatus, in accordance with the third aspect of the invention, illustrating three steps in breaking down of a particle in a gap defined between circumferential surfaces of the rollers;

FIG. 14 shows a diametric section of a roller of a comminution apparatus, in accordance with the third aspect of the invention, which has cooling means.

DETAILED DESCRIPTION OF THE INVENTION

Figure 1:
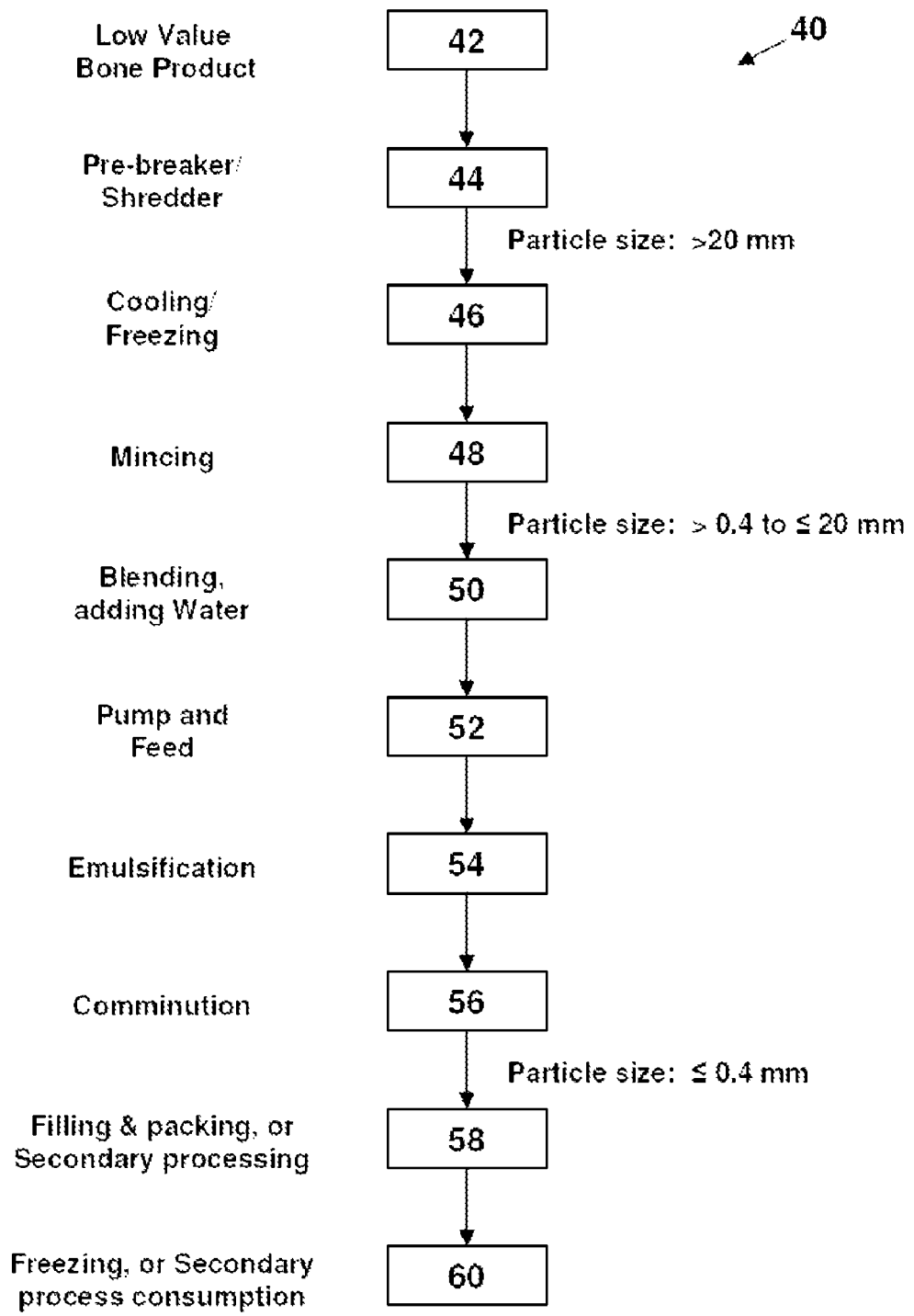
FIG. 1 is a schematic of an implementation of a method of processing commercially exploited livestock bone product, in accordance with the first aspect of the invention.

Referring to the schematic of FIG. 1, reference numeral (40) schematically indicates a first example implementation of a system and method for processing bone product according to the invention.

In a first step of the system and method, at (42) in the schematic, commercially exploited livestock carcasses are stripped of their meat and flesh to a low value bone product. In a preferred implementation of this step, the commercially exploited livestock carcasses are stripped of their meat mechanically to yield what is known as "mechanically deboned meat", which is primarily for consumption by humans. In another implementation, the meat is stripped from the commercially exploited livestock carcasses by hand. Irrespective of the particular implementation of the first step, the stripped carcasses are subject to minimal handling to reduce the likelihood of bacterial contamination.

After stripping the commercially exploited livestock carcasses of their meat, they comprise mainly bone but also bone marrow and residual pieces of meat, fat, and sinew, labelled commercially exploited livestock bone.

At (44) in the schematic, dependant upon the size of the commercially exploited livestock bones relative to the size of the throat of the first stage mincer (48), the bones may be pre-broken by passing them through a size reducing apparatus, such as a "pre-breaker" or "shredder".

At (46) in the schematic, the product is cooled in a freezer to a temperature of between about −1° C. to about −20° C.

At (48) in the schematic, using a commercial mincer, having been configured with suitable knives and plates, the frozen product from (46) is comminuted to a first minced product having a particle size of under 20 mm.

The first minced product is fed into a blender and, at (50) in the schematic, cooled water or ice may be added. The resulting mixture is blended and then fed into a pumping container.

At (52) in the schematic, the blended product from the pumping container is forced into a commercial emulsifier.

Figure 2:
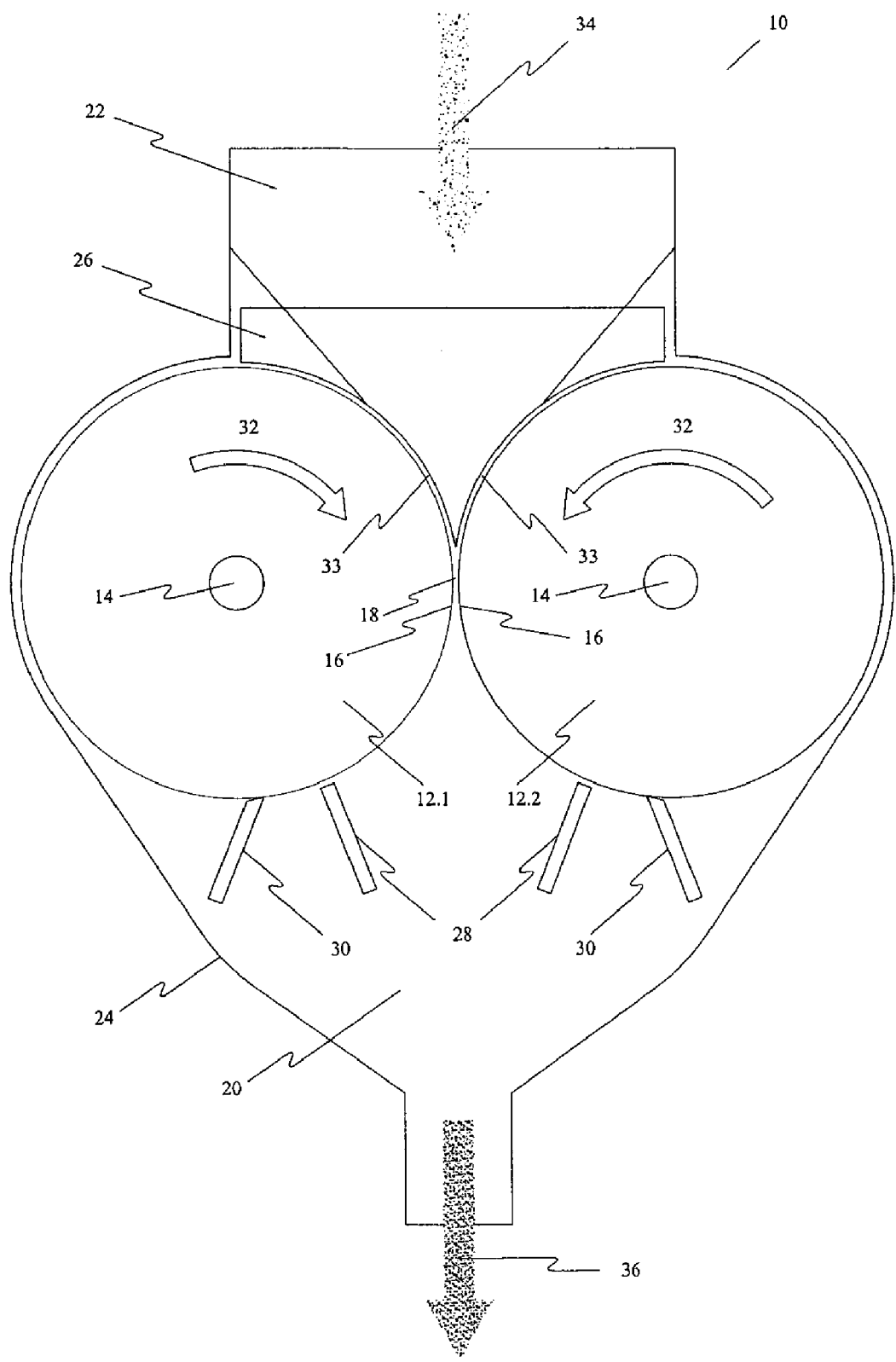
FIG. 2 shows a sectional elevation of an embodiment of a comminution apparatus, in accordance with the third aspect of the invention.

At (54) in the schematic, using the Emulsifier, having been configured with suitable knives and plates, the product is minced to produce a second minced product having a bone particle size to suit the design input size parameter of the comminution apparatus (10, see FIG. 2).

At (56) in the schematic, the product is then fed into the hopper (22) of the comminution apparatus (10) of FIG. 2. The gap (18) between the rollers (12) of the apparatus (10) had been adjusted to a size under 0.4 mm, but above 0.02 mm. The product is passed through the gap (18, see FIG. 2) to yield a comminuted commercially exploited livestock bone product in the form of an emulsion, having a paste-like consistency. Any commercially exploited livestock product is an example of product that can be comminuted by the apparatus (10), using a comminution apparatus in accordance with the invention. More specifically, any foodstuff including the comminuted commercially exploited livestock bone product is an example of a foodstuff. The comminuted commercially exploited livestock bone product may be combined with spices, other ingredients and a binder, such as starch, plant fat, or animal fat, for more volume or to further accommodate considerations of cost, texture, taste and/or aesthetics of the eventual processed foodstuff.

At (58) in the schematic, the comminuted commercially exploited livestock bone product is then either directly introduced into a secondary food processing process or is fed into a commercial filling apparatus which fills it into moulds, each block weighing a preset value, which are then conveyed into a commercial freezer, where they are quick frozen, at (60) in the schematic.

The temperature of the product is typically kept below 15° C. throughout the entire method.

Referring initially to FIG. 2, a comminution apparatus in accordance with the invention, is designated generally by the reference numeral (10). The apparatus (10) is particularly suitable for the comminution of commercially exploited livestock product and particularly, commercially exploited livestock bone product, as will be described below.

The apparatus (10) includes two rollers (12.1 and 12.2), made of stainless steel or other corrosion resistant material. Each roller (12) has an axle (14) and defines a round cylindrical outer surface (16). The axles (14) of the rollers (12) are mounted parallel to each other on a chassis or frame via a mounting arrangement including bearings in a configuration in which a minimum gap (18) is defined between the surfaces (16). The chassis and mounting arrangement permit adjustment of the size of the gap (18). The chassis and mounting arrangement may be essentially of a conventional type and, as such, are not described and illustrated herein. In the present example, the size of the gap (18) is adjustable to be parallel or not and throughout a range of 0.02 mm to 25 mm at the narrowest point.

The diameter of each roller (12) is approximately 600 mm and its width is approximately 400 mm.

The apparatus (10) includes also:
a stainless steel housing (20), defining an inlet hopper (22) and an outlet hopper (24);

a conventional drive arrangement (not shown), including an electric motor, for driving the rollers (12);

two opposite sealing plates (26); and an arrangement of scrapers or shields (28 and 30) for wiping comminuted material from the surfaces 16, as will be described below.

The drive arrangement is configured for driving the rollers (12) in a counter-rotating fashion, as indicated by arrows (32).

One position of the respective plates (26) relative to the rollers (12) are also shown, in broken lines, in FIG. 3. The respective plates (26) prevent leakage of product along sealing gaps (33) (which may have a gap size tending towards 0, as defined between the respective plates (26) and rollers (12)).

In order to comminute a product using the apparatus (10), the drive arrangement is activated. The product is fed into the hopper (22), as indicated by an arrow (34), passes through the gap (18) defined between the rollers (12), and is discharged from the hopper (24), as indicated by an arrow (36).

FIG. 3 shows a plan view of the rollers (12.1 and 12.2), each having a pattern of texturing applied to its outer surface (16). Broken lines show one of the approximate positions possible for the respective sealing plates (26) with respect to the rollers (12). The pattern of texturing is in the form of a series of circumferentially spaced chevrons (38). The chevrons (38) on the roller (12.1), which operatively is rotated at a lower rotational speed, point in their own leading direction during rotation of the roller. The chevrons (38) on the roller (12.2) point in their own trailing direction during rotation of the roller.

The texturing may be defined on the rollers (12) by any one of several different methods, including casting, machining, knurling, or the like. The depth of texturing may be in the range 30 µm to 100 µm.

FIGS. 4a, 4b, and 4c show how, at the gap (18) in FIG. 2, a chevron (38.1) on the roller (12.1), is displaced relative to a chevron (38.2) on the roller (12.2) to "overtake" it. Such relative displacement of the chevrons causes crossing points (39) between the chevrons (38.1 and 38.2) to converge towards a point (41, see FIG. 2) midway across the width of the surfaces (16) in the region just above the gap (18). The rollers (12) thus tend to displace a product being comminuted by the apparatus (10) towards the point (41).

The texturing applied to the outer surfaces (16) of the rollers (12) enhances frictional engagement of a product in the hopper (22), thus ensuring that the product is dragged along with the surfaces (16) and through the gap (18). The texturing thus effectively reduces the required diameter of the roller to conduct this task as compared to a similar roller manufactured of the same material without the surface texturing, as explained with reference to FIG. 7 below.

FIG. 5 shows a diamond mesh texturing pattern that may alternatively be applied to each of the rollers (12).

FIG. 6 shows a transverse line texturing pattern that may alternatively be applied to each of the rollers (12).

Clearly, the texturing patterns on the respective rollers (12) may also differ from each other and can also have different combinations of patterns across the width of each roller (12), independently from the other roller (12), to achieve different engineering objectives in the design of the apparatus (10).

After the inventors completed a process of interacting with the international business community to provide a conventional shear cutter based technology capable of producing commercially viable quantities of comminuted commercially exploited livestock bone product fit for human consumption, it was found that no conventional shear cutter based technology from industry could produce more than 300 kg per hour of comminuted commercially exploited livestock bone product (without raising the temperature above 30° C.) in an 8 hour shift. The system and method of operating the system according to the invention, in combination with the comminution apparatus according to the invention can now jointly produce between 8-55 metric tonnes of comminuted commercially exploited livestock bone product in an 8 hour shift with comparably sized machinery, which clearly indicated the impact this invention will have on the processed food industry, as well as the overall human food chain.

Figure 7:
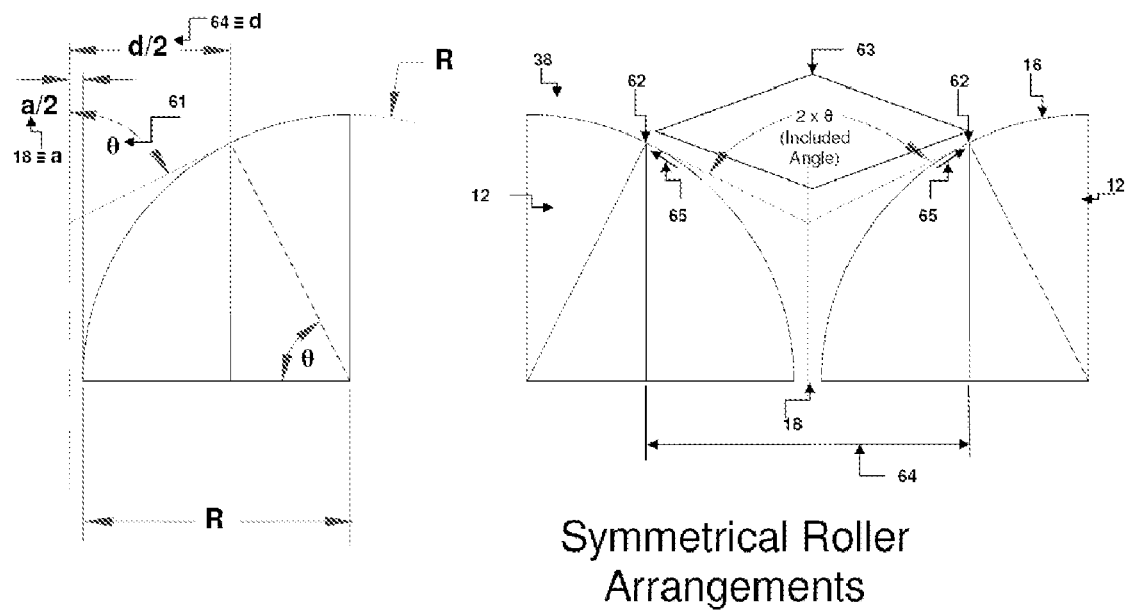
FIG. 7 is a schematic of the effect of surface texturing on the minimum required diameter of at least two equally sized rollers, defining an effective included angle between the rollers allowing particles below a critical size to be drawn into the gap under frictional forces generated from normal contact between the particles and the surface of the rollers, in accordance with the fourth aspect of the invention.
Figure 8:
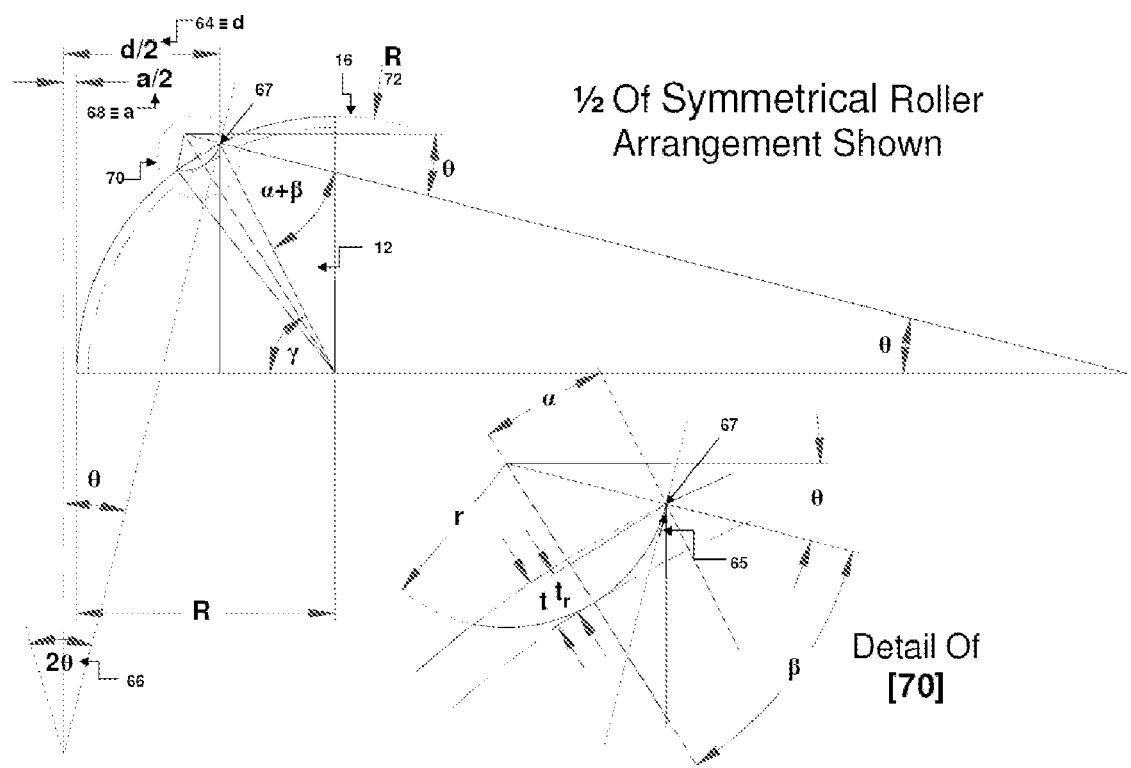
FIG. 8 is a schematic of the effect of surface shaping on the minimum effective included angle between at least two equally sized rollers, allowing particles below a critical size to be drawn into the gap under a lower frictional force than would be generated from surface texture only, thus effectively decreasing the nominal diameter of the roller pairs required relative to the size of particle, the size of the minimum gap between the at least one shaped roller and it opposite roller, the size and depth of the dimple, jointly assisting in creating normal contact between the particles and the surface of the rollers, in accordance with the fifth aspect of the invention.

Referring to the schematic of FIGS. 7 and 8, the effect of surface texturing (38) and surface shaping (70) on the required roller (12) diameters to enable particles (63) under a specific size (64), to be drawn into the gap (18) by the rotating action between the at least two essentially round roller surfaces (16) (with either texturing or shaping applied) is explained.

FIG. 7 schematically presents the considerations affecting roller radius (71) as a direct result of added surface texture (38) to the contacting surfaces (16) between two counter-rotating roller pairs (12). The required roller (12) radius (71) is essentially due to the geometric relationship between the included contact angle (61) between the two rollers (12) at the contact point (62) between the two rollers (12) and a specific particle (63) of a specific size (64). The required included contact angle (61) between the two rollers (12) at the particle contact point (62) to draw the particle into the gap (18) between the rollers is equal to the mathematical inverse Tan function of the coefficient of friction (65) between the roller surface (16) and the particle (63). Trigonometrically, the required coefficient of friction (65) required between the rollers (12) to draw the particle (63) into the gap (18) can be calculated with the following formula (inversely, the required minimal roller diameter can be calculated if the coefficient of friction (65) between the particle (63) and the roller (12) is known by solving the equation for R):

$$\theta = \text{Cos-1}\{[R-((a-d)/2)]/R\}$$

$$\text{thus } \mu\text{needed} = \text{Tan}(2*\theta)$$

Variables definitions:
R=Minimum roller radius (71); mm
a=Minimum gap between the roller surfaces (180; mm
d=Maximum particle size, as defined (64); mm
θ=Maximum included half-angle between two tangential lines to the roller surfaces at the points of contact (61); °
µneeded=Smallest coefficient of friction between the rollers needed to pull the particle into the gap (65); Dimensionless Quantity.

FIG. 8 schematically presents the considerations affecting included contact angle (66) between the two roller surface shapes (70) (only one dimple shown) on outer radius (72) as a direct result of added dimpled surface shaping (70) to the contacting surfaces (16) between two counter-rotating roller pairs (12) (only one roller partly shown). The determined actual included angle (66) is due to the geometric relationship between the two roller surface shapes (70) at the contact point (67) between the two rollers (12) and a specific particle (63, see FIG. 7) of a specific size (64). The minimum calculated actual included contact angle (66) between the two rollers surface shapes (70) at the particle contact point (67) to draw the particle into the minimum pass gap (68) between the rollers is again equal to the mathematical inverse Tan function of the minimum coefficient of friction (65) needed between the roller surface (16) of the surface shape (70) and the particle (63) to draw the particle into the gap. Trigonometrically, the included contact angle (66) between the two roller surface shapes (70) can be calculated with the following approximation formulas (which formula is valid for variables within the preset ranges as set out below, while the percentage error in the calculation is approximated by the relationship shown compiled from geometrical results). Note that a geometrical method (not explained) is the simplest method to accurately determine the results and is the inventor's preferred way to determine the answers, typically using an appropriate CAD program.

For, $tr \approx t$ which is approximately true for $r << R$:

Then:

$E\% \leq \{[r/(2*R)]*[1-(t/r)]\}*100$ $\beta \approx \cos^{-1}((r-t)/r)$ $SR \approx 2*r*\sin\beta$ $\alpha \approx SR/(2*R)$ $\gamma \approx \cos^{-1}\{[R-((d-a)/2)]/R\}$ $\theta \approx \gamma - \alpha - \beta$ thus $\mu_{needed} \approx \tan(2*\theta)$ Further, $N \leq (\pi*R)/\{[r2-(r-t)2]^{1/2}\}$; $N \in$ Integers Variable definitions:
E %=Maximum error between calculated approximation and the geometrical exact solution; %
R=Minimum outer roller radius (71); Range R≧150 mm
a=Minimum gap between the roller surfaces (18); Range $\epsilon$[0.02 to 0.4] mm
d=Maximum particle size, as defined (64); Range $\epsilon$[2 to 25] mm
r=Radius of the surface dimple shape (73); Range $\epsilon$[2 to 20] mm
t=Dimple depth, as measured from the bottom of the trough of the dimple to the middle of the segment removed from the roller surface by the dimple (74); Range $\epsilon$[0.05 to 0.5] mm
β=Angle between roller and dimple centroid line and the line from the dimple centre to the point of contact; °
SR=Roller segment length removed by the dimple; mm
α=Angle between roller and dimple centroid line and the line from the point of contact to the roller centroid; Calculated in Rad, then converted to °
γ=Geometric angle between the line connecting the contact point to the roller centroid and the line connecting the two centroids of the two rollers; °
θ=Maximum included half-angle between two tangential lines to the roller surfaces at the points of contact (61); °
μneeded=Smallest coefficient of friction needed between the rollers and the particle (65); Range $\epsilon$[0.002 to 0.35] dimensionless quantity
N=nominal quantity of dimples that can be equally spaced around the radial circumference of the roller and must be an element from the integer set of numbers (75); Range $\epsilon$ Integers.

Figure 9:
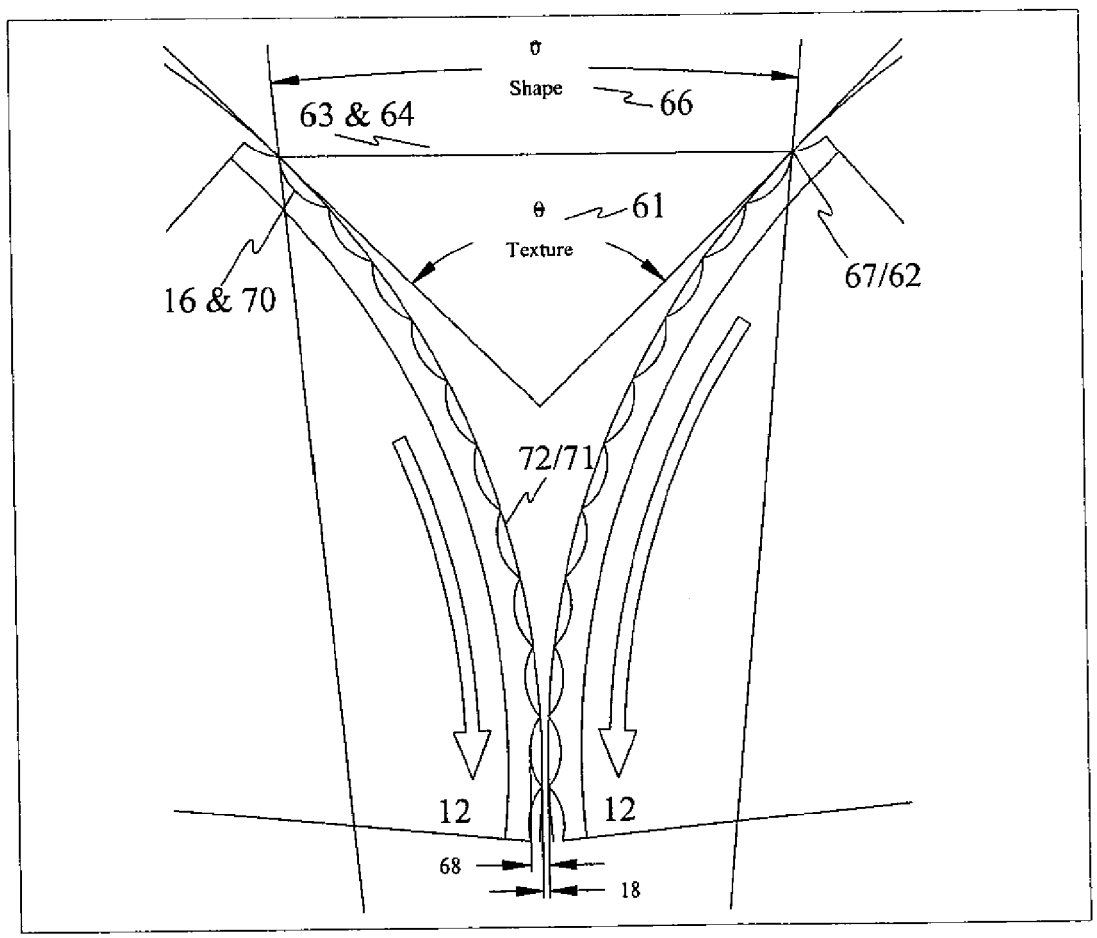
FIG. 9 combines the effects of the fourth and fifth aspect of the invention to demonstrate the fundamental differences between the two aspects, by superimposing them on similarly sized rollers.

FIG. 9 combines the effects of the surface texturing and shaping according to the invention which affect the included contact angle due to surface texture (61) and due to surface shaping (66), respectively, to demonstrate the fundamental differences between the two invention aspects, by superimposing them on similarly sized rollers (12). The two contact angle lines both originate at the same contact point (for texturing (62) and for shaping (67)) of a specific particle (63) of a specific size (64) and are orientated tangentially to the respective texturing and shaping surfaces, at the contact point. The include angle between the respective line sets defines the included contact angle between the rollers for surface texturing (61) and surface shaping (66). The minimum gap (18) between the rollers is determined by the minimum distance between the respective roller sets. The minimum pass gap (68) for surface shaping (70) is also indicated. FIG. 9 also shows the dimple effect of FIG. 8 more completely. FIG. 9 additionally shows the throat (or gap) section detail for FIG. 8 and how the grooves (70) effectively reduce the gripping angle (66). With this type of groove (70), therefore, larger feed particles (63 & 64) can be gripped for a given roller diameter size (72). Depending on the coefficient of friction between the feed particle and the roller surface, the included angle (66) will determine the effectiveness of the surface shaping geometry (70) to draw the particle (63) of a specific size (64) into the gap (18) between the rollers (12). In tests it was found that this type of groove (as is expected from similarly rounded shapes) works well for commercially exploited livestock product and particularly commercially exploited livestock bone product under discussion.

The surface shaping may have a depth exceeding 50 μm.

FIG. 10 shows the mechanism of the proximity scrapers according to the invention, where accumulated comminuted material (75) on the proximity scraper (38), in the form of a body, landing (79) removes the comminuted material (73) from the roller surface (16) or the roller surface (16) and the surface shapes (70). It also show the spawling (80) from material passing through the gap (18, in FIG. 9) between the rollers (12) of the comminution apparatus (10, in FIG. 2) and spawling (76) after the proximity scraper (28), which both (80 & 76) assist in passing the comminuted material (73) through the comminution apparatus (10). Spawled material (80 & 76) falls (78) onto the apparatus (10) hopper (24). Accumulated scraped comminuted material (75) also drops (77) from the proximity scraper (28), landing (79) onto the apparatus (10) hopper (24). The proximity (74) of the proximity scraper (28) to the roller (12) surface (16) and shaping (70) is also shown.

Figure 11:
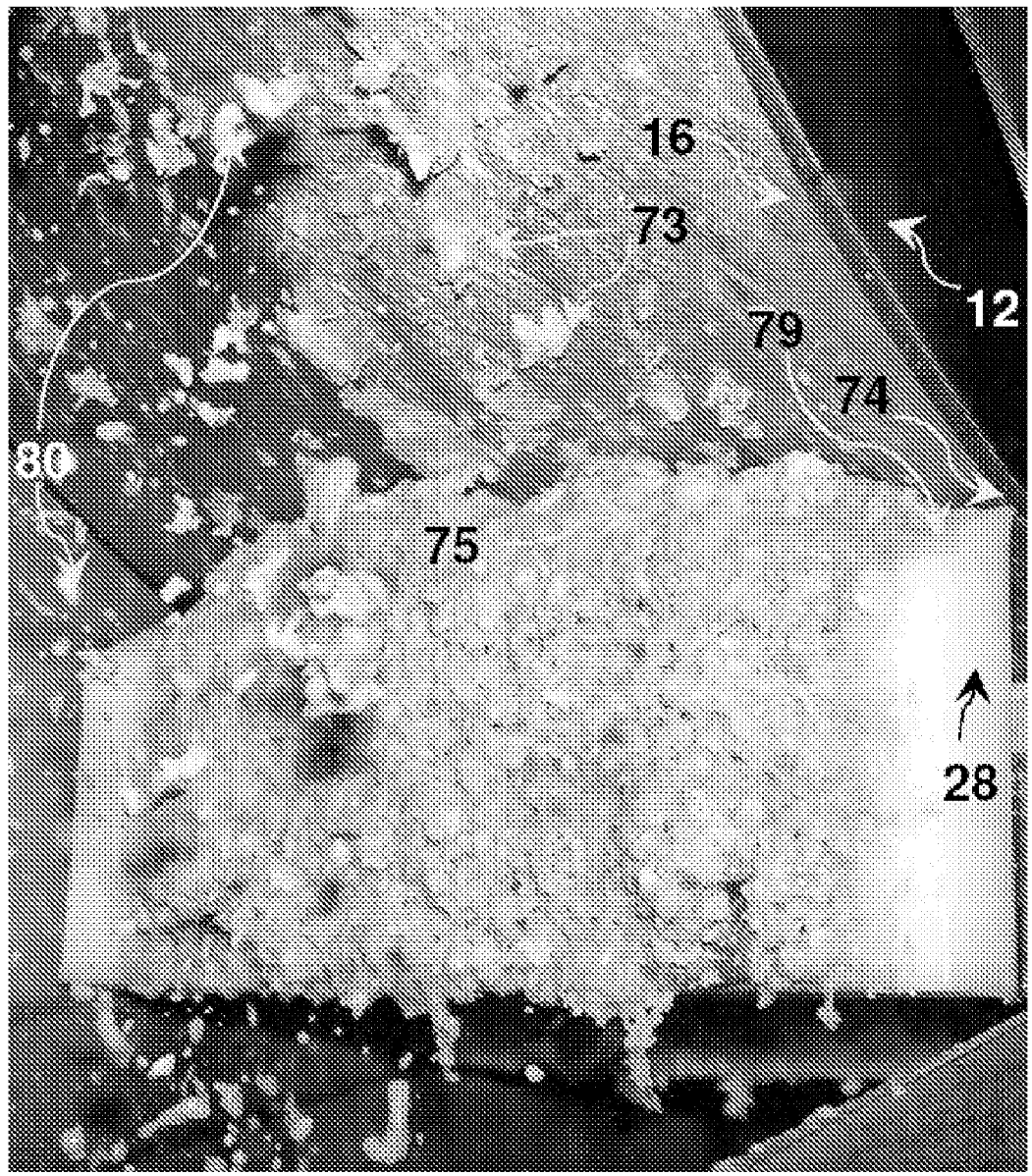
FIG. 11 is a high speed photograph of the roller surface showing, amongst other things, comminuted product flakes starting to peel off the roller surfaces and of the accumulating comminution pile on the proximity scraper landing wiping the comminuted material from the proximate roller.

FIG. 11 is a high speed photograph of the roller (12) and roller surface (16) showing, amongst other things, comminuted product flakes (73) starting to peel off the roller surfaces (16). The accumulating comminution pile (75) on the proximity scraper's (28) landing (79), wiping the comminuted material (73) from the proximate roller (12), is also indicated. Evident is the presence of spawled comminuted material (80) from the gap (18, in FIG. 9). The proximity distance (74) between the proximity scraper (28) landing (79) and the roller surface (16) is also indicated.

The following sample calculations are provided to demonstrate the principle effect of surface texturing and surface shaping on the size of particle able to be drawn into the gap, which is dependant upon the magnitude of the effective included contact angle, which directly relates to the minimum coefficient of friction that is required between the particle and the roller surface, resulting in a much more compact and cost effective roller diameter to realise the embodiment of the apparatus (10) of the third aspect of the invention:

Calculation 1:
Plain roller, calculate required coefficient of friction needed
For: R=500 mm, and
a=0.1 mm, and
d=6.0 mm, and
θ=6.23°, and
Then: μneeded=0.22
Calculation 2:

Same plain roller as in calculation 1, but with a surface texture added that increases the coefficient of friction from 0.22 to 0.3—calculated from the inverse function, as explained, used to calculate μneeded in the calculation above:

For: μ=0.30, and
θ=8.35°, and
a=0.1 mm, and
d=6.0 mm, and
Then: Rneeded=278.3 mm The required diameter of the roller to drag the same 6 mm particle into the gap has been reduced from 1000 mm to 557 mm by only adding a different surface texturing.

Calculation 3:
Same roller arrangement as used in Calculation 1 and 2, but with only dimples added to the roller outer surface. The required coefficient of friction between the rollers and particle needed to draw the same sized particle into the reduced diameter rollers (as calculated from Calculation 2 above) is calculated from the following estimation:

For: R=150 mm, and
a=0.1 mm, and
d=6 mm, and
r=10 mm, and
t=0.1 mm, and
Then: E %≦3.3%, and
β=8.110°, and
SR=2.821 mm, and
α=0.009404 Rad=0.539°, and
γ=11.382°, and
θ=2.733°, and
μneeded=0.096, and
N=334 dimples.

Note that the required coefficient of friction between the 6 mm particle and the roller surface is very much lower than for a surface texture roller of even much larger diameter, indicative of the fact that the dimples allowed the roller diameter to be reduced significantly, while simultaneously improving traction between particles and the roller surfaces when entering the gap. Also note that if the calculated angle θ is negative (i.e. smaller than 0°), then the dimple mechanically entraps the particle, and will pull the particle into the gap, independent of the coefficient of friction between the roller surface and the particle.

As can be clearly seen from the results of these calculations, correctly applied surface texturing that increases the coefficient of friction between the roller surface and the particle reduces the required roller diameter to draw the particles into the gap of the apparatus relative to the required frictional coefficient, as defined. Similarly, appropriately applied surface shaping reduces the required roller diameter relative to the needed coefficient of frictional between the particle and the roller surfaces, and can do so independently from surface texturing.

It is expressly envisaged by the inventors that the same principles for reduced diametric roller sizing can be achieved with other shaped surface shaping and that appropriate geometric based trigonometric formulas and geometrical representations can be used to evaluate and determine appropriate roller nominal diameters.

FIGS. 12a, 12b, and 12c show a detail of parts of the rollers of a comminution apparatus, in accordance with the invention, illustrating three steps in breaking down of a particle in a gap defined between circumferential surfaces of the rollers. The breaking down occurs via a pulling process occurring between two surfaces (12) where one surface (position indicator 90) moves faster (92) than the other (position indicator 91) and a particle (63) squeezed between the two surfaces into the gap (18), which is anchored to each surface at opposite/different points (96 & 97), due to frictional contact, so that one part of the contacting particle stays with one of the surfaces (96) and the other part of the same particle moves with the other surface at the contact point there (97), thus creating a deliberate (i.e. considered) breaking force that pulls the particles apart along splitting areas (i.e. opening cracks) in the material (93), which grow (94) and grow (95), while new 'cracks' (98) are formed and added (99), thus assisting comminuting the material additional to the simple squeeze process which occurs when the particle (63) enters the gap (18). In mechanical engineering, this is a commonly and easily understood process.

Figure 13:
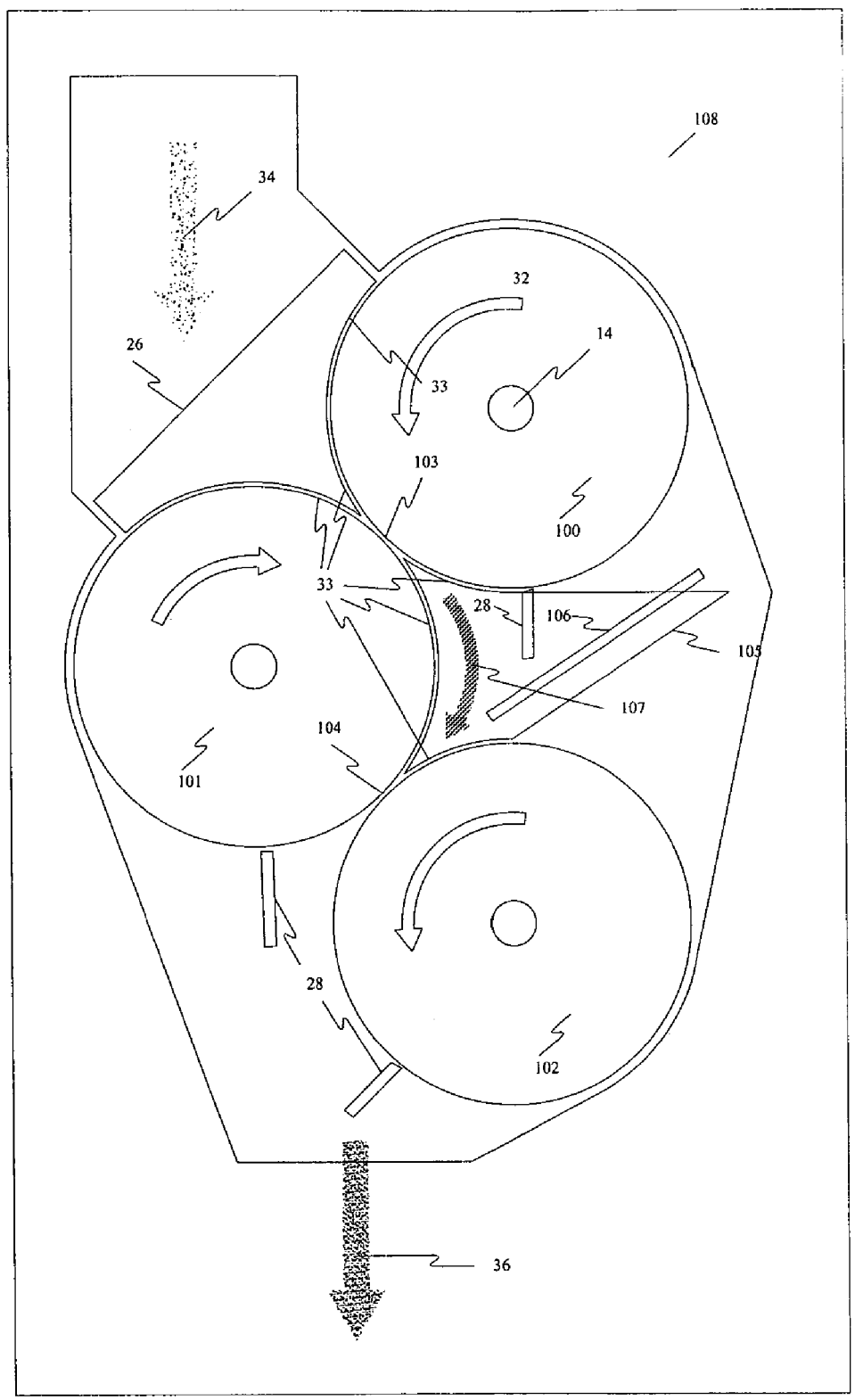
FIG. 13 shows a sectional elevation of a further embodiment of a comminution apparatus, in accordance with the third aspect of the invention.

In FIG. 13, (108) designates a multi roller apparatus embodiment of the same comminution apparatus which comminutes the material in a continuous double pass to better comminute the material. The layout and components of this embodiment are essentially the same as for the two roller apparatus, except that three rollers are defined, each having its own surface condition. Roller (100) has surface shaping applied; roller (101) has a very shallow surface texture applied, as does roller (102). Roller (101) is in common contact with the other two rollers (100) and (102). Two separate gaps between the roller sets are defined as gap (103, between roller set (100) and (101)) and gap (104, between roller set 101 and 102). The first gap (103) may be larger than the second gap (104). Input material (34) passes through the first gap (103) to pre-break (rough comminute) the input material. The partially processed material (107) then passes through the second gap (104) which finally comminutes the material (36), which then exits the apparatus. Proximity scrapers (28), two separate sealing plate sets (28 and 105) and an intermediate collector plate (106) are used to guide and assure the processed product passes through the process.

It is a specific consideration by the inventors that with appropriate surface texturing and surface shaping applied to the rollers (as defined under the fourth and fifth aspect of this invention, respectively) the roller diameters need not all be of the same size, i.e. roller (100) can be significantly smaller than the other two (rollers (101) and (102)—as can roller (102) also be much smaller than roller (101)). As such, it would thus be possible to add additional rollers into the system, with typically a decreased gap sizes between consecutive roller sets. Provided that only gravity is used to introduce and collect intermediate processed material, then only one half of the common roller (101) can be used in a vertical arrangement. Should the semi-processed material be collected via gravity and an appropriate receptacle, and then be forcefully introduced (by means for example with a pump system) into the next roller set gap, much more of the common roller outer surface is available for consecutive comminution steps and thus even more additional rollers can be added, in either a vertical or horizontal arrangement (in a 'horizontal' arrangement, processed material is typically removed in the axial direction of the rollers—under gravity—else an energized means of removal is needed).

FIG. 14 illustrates a typical cooling circuit that can be applied to at least one of the rollers. Coolant is introduced via a standard union (110) into the axle (14) of the roller (12) and flows into an inner cavity (112), where the coolant removes heat from the outer surface (16) by normal thermodynamic heat flow means. After collecting some of the heat from the outer surface (16), the coolant flows out of the roller (12) via another exit in the other end of the axle (14), fitted with a standard union (111). The coolant is then typically dumped (open loop system) or circulated through an external heat exchanger to remove the collected heat from the coolant. Ideally, the inner cavity (112) is as close to the roller surface (16) as practicably possible without affecting the mechanical strength of the roller too much. A typical means of doing this is to use channelled and shaped grooves running directly under the outer surface shell of the roller. Numerous standard configurations for applying this cooling are available in industry.

The cooling here, due to the extremely thin profile of material passing through the narrow gap, near instantly cools the material down to any desired temperature and is a very effective means of cooling high volumes of material in a short period, through to the core of a heaped mass. The principle whereby this happens is in accordance with very basic thermodynamic principles and requires no further explanation.

Table 1 shows a comparison of commercially available MDM and the comminuted commercially exploited livestock bone product sourced from some of the test work conducted as part of the above example system and method of the invention.

TABLE 1

|  | Dry material | Moisture | Calcium | Fat | Protein |
|---|---|---|---|---|---|
| Accreditation Number | ASM 013 | ASM 013 |  | ASM 044 | ASM 041 |
| Unit | % | % | % | % | % |
| MRM | 39.03 | 60.97 | 3.85 | 12.78 | 13.71 |
| MDM | 33.1 | 66.9 | 0.09 | 16.9 | 14.04 |

Note:
MRM refers to the comminuted commercially exploited livestock bone in accordance with the invention.
MDM refers to imported mechanically deboned meat.
Fat content was measured by ether extraction.

The frozen comminuted commercially exploited livestock bone product may be transported to a meat processing installation for utilisation in the production of processed meat products. Alternatively, on its own, after adding the necessary flavouring, fats and gelatine, the product can be used as a foodstuff without further processing. In the production of a processed meat product, the comminuted commercially exploited livestock bone product is combined with a meat mixture and the resulting composition is shaped into the processed meat product using conventional mixing and shaping methods and apparatus. In a preferred embodiment of the invention, the processed meat product is intended for human consumption, which may be, for example, a cooked luncheon meat (or 'cold meat') product such as polony or vienna sausages.

In different embodiments of the foodstuff the comminuted commercially exploited livestock bone product is combined with a binder material selected from, for example, starch, an animal fat or a plant fat prior to being combined with the meat mixture for the production of the processed meat product.

All work surfaces used whilst carrying out the method steps of the invention should be of stainless steel or of equivalent food grade material, for hygiene purposes.

The test results from Table 1 show that the comminuted commercially exploited livestock bone product is suitable for use as an animal protein product, and hence for use as a non-meat constituent of a processed meat product for human consumption.

From research conducted by the inventors, as much as 80% of bone produced during slaughtering of commercially exploited livestock can be recovered and processed for human consumption by means of the system and method of the invention, in combination with the comminuting apparatus according to the invention, which was not possible on a commercially viable basis before this invention. The system and method of the invention will provide a use for what is otherwise a near-waste product suitable only for compost or pet and animal fodder, as an economical nutritional foodstuff, fit for human consumption. The comminuted commercially exploited livestock bone product of the system and method of the invention, incorporating the comminuting apparatus will also provide a suitable alternative (or complementary) ingredient to mechanically deboned meat, which is currently used in the meat processing industry.

From extensive market and literature research conducted by the inventors, it is an advantage of the system and method of the invention, incorporating the comminuting apparatus illustrated that the system and method of the invention is very much faster than prior art methods known to be used in industry. Prior art methods generally take at least one hour, and usually longer, to convert small quantities (200 kg to 300 kg) of raw commercially exploited livestock bone into a comparable processed comminuted product, without exceeding double the temperature limitation of 15° C. The problem with such prior art methods is maintaining a sufficiently low temperature during the relatively lengthy method to prevent the growth of micro organisms. The system and method of the invention, incorporating the comminuting apparatus of the invention, on the other hand, takes as little as 5 minutes from unprocessed bone to final product and the temperature at which the method is carried out are readily regulated at a temperature sufficiently low (below 15° C.) to limit the growth of micro organisms to acceptable levels and still produce between about 17 kg and 120 kg of product per minute. This rate of production is substantially higher than that of prior art methods identified from the extensive research conducted by the inventors and literature search companies employed by them. Preferably, the system and method of the first aspect of the invention, incorporating the comminuting apparatus of the invention is conducted in an automated plant which is maintained at a temperature between 7° C. to 12° C., or lower. Because the system and method is automated, there is no human contact handling comminuted commercially exploited livestock bone product during the process, so that bacterial contamination is kept to a minimum. It is a further advantage of the invention illustrated that, because the system and method is carried out rapidly and at a low temperature, there is very much better retention of protein value and a very much better binding value in the product than in those of prior art products identified from the research conducted. The system and method of the invention thus produces a superior product when compared with prior art products and produces the product in a much shorter time than prior art methods could.

A further advantage of the system and method of the invention illustrated is the use of the comminuting apparatus (10) (in FIG. 2) in a final comminution step. The Inventors have found that the use of such an comminuting apparatus caused significantly less heat build-up in the product being comminuted than would have been the case had a commercially available emulsifier or meat grinder (both being based on conventional shear-cutting technology) been used for the comminution of commercially exploited livestock product and particularly, commercially exploited livestock bone product to a comparable particle size and at a similar production rate. As such, degradation of the product regarding micro organism growth and retained protein values are minimized in the method of the first aspect of the invention, incorporating the comminuting apparatus of the invention.

Other implementations of the system and method of the invention may vary significantly from the above-mentioned example in that some of the steps prior to the introduction of the commercially exploited bone product into the comminution apparatus (10) of FIG. 2, the commercially exploited livestock bone is pre-broken through the same type of apparatus as the comminuting apparatus (10) according to the invention, with a wider gap setting 18 such that the commercially exploited livestock product and particularly, commercially exploited livestock bone product is broken into small enough pieces to suit the design specification of the comminuting rollers (12). As such, the invention extends to any system and method, including the system and method of the invention, as defined herein. Some possible variations in other implementations will now be described.

The Inventors envisage that a comminution apparatus, in accordance with the invention, may be provided which is essentially a scaled-up version of the apparatus (10) of FIG. 1 or one fitted with the appropriate dimpled roller surface shaping to suit the purpose, as explained under FIG. 8 above. It is particularly envisaged that such an apparatus fitted with the dimpled surface shaping is ideally suited to this application and may be able to comminute bone having a particle size of 20 mm or even larger, up to whole bones through an effective gap size not exceeding 0.3 mm, thus yielding a foodstuff in accordance with the invention. Alternatively, such an apparatus may operate with a larger gap and the system and method may include passing the commercially exploited livestock product and preferably, the commercially exploited livestock bone through the same apparatus again, at the same or different settings or the use of a second comminution apparatus, e.g. the apparatus 10 fitted with surface textures, to further comminute the product that has passed through the scaled-up apparatus. The scaled-up apparatus may thus obviate the need for the pre-breaker, grinder, blender and/or emulsifier of the above example.

The particle size to which the commercially exploited livestock bone product is minced or pre-broken is highly variable.

The gap size of the comminution apparatus is highly variable and, as such, the particle size to which a commercially exploited livestock bone product is comminuted by such an apparatus is variable accordingly. The inventors suggest, for use in a final comminution step, a gap size in a range 0.02 mm to 0.4 mm, and more preferably a gap of 0.02 to 0.1 mm.

It will be appreciated that it is possible to alter further aspects of the embodiments described above without departing from the scope of the invention.

The invention claimed is:

1. A comminution apparatus for bone product configured to receive bone product and comminute it to a size of less than 0.1 mm, comprising:
   a pair of rigid rollers rotatably located with respect of each other to define a gap of between 0.02 mm to 0.4 mm,
   a drive counter rotationally driving the rollers to a relative rotational speed ratio of not greater than 2:1,
   at least one of the rollers having a surface with one or both of surface texturing and surface shaping applied to it, the surface shaping and surface texturing having a depth of at most 0.025 mm.

2. The apparatus of claim 1, wherein the gap between the pair of rollers is between 0.02 mm and 0.1 mm.

3. The apparatus of claim 1, wherein the surface shaping and surface texturing has a depth of about 0.01 mm.

4. The apparatus of claim 1, wherein the surface texturing includes a plurality of concave randomly distributed grooves in the roller surface.

5. The apparatus of claim 1, wherein the surface texturing includes a plurality of circumferentially spaced criss-cross shallow grooves or knurling between axially aligned flat areas of the opposing rollers.

6. The apparatus of claim 1, wherein the surface texturing includes a plurality of circumferentially spaced transverse straight shallow grooves between axially aligned flat areas of the opposing rollers.

7. The apparatus of claim 1, wherein
   one roller, operatively driven at a higher tangential velocity of its circumferential surface than the other, includes surface texturing in the form of a plurality of circumferentially spaced chevrons pointing in their own trailing direction during rotation of the roller, and
   the other roller includes surface texturing in the form of a plurality of circumferentially spaced chevrons pointing in their own leading direction during rotation of the roller.

8. The apparatus of claim 1, wherein both rollers, operatively driven at different tangential velocities of their circumferential surfaces, have texturing on their roller surfaces embodied as a plurality of circumferentially spaced shallow tubular grooves of which the axial direction is oriented in the general direction of each roller axis and parallel to the centroid axis along the length of the gap between the rollers.

9. The apparatus of claim 1, wherein the apparatus is configured so that the following applies to a circumferential surface with surface texturing of at least one of the rollers:

$\mu >= \mu_{needed}$, where $\mu_{needed} = \text{Tan}(2*\theta)$, and $\theta = \text{Cos}-1\{[R-((a-d)/2)]/R\}$ in which R=Minimum roller radius; in mm
a=Minimum gap between the roller surfaces; in mm
d=Maximum particle size, as defined; in mm
θ=Maximum included half-angle between two tangential lines to the roller surfaces at the points of contact; in °; and
$\mu_{needed}$=Smallest coefficient of friction between the rollers needed to pull the particle into the gap; as a dimensionless quantity.

10. The apparatus of claim 1, wherein the surface shaping comprises a plurality of transverse grooves and semi-spherical dimples.

11. The apparatus of claim 1, wherein the apparatus is configured so that the following applies to a circumferential surface with surface shaping of at least one of the rollers:

$\mu >= \mu_{needed}$ $t_r \approx t$, which is approximately true for $r << R$ $E_{\%} \leq \{[r/(2*R)]*[1-(t/r)]\}*100$ $\beta \approx \text{Cos}^{-1}((r-t)/r)$ $S_R \approx 2*r*\text{Sin } \beta$ $\alpha \approx S_R/(2*R)$ $\gamma = \text{Cos}^{-1}\{[R-((d-a)/2)]/R\}$ $\theta \approx \gamma - \alpha - \beta$ $\mu_{needed} \approx \text{Tan}(2*\theta)$ $N \leq (\pi*R)/\{[r^2-(r-t)^2]^{1/2}\}$; N∈Integers in which $E_\%$ = Maximum error between calculated approximation and the geometrical exact solution; %
R = Minimum outer roller radius; in a range $R \geq 150$ mm
a = Minimum gap between the roller surfaces; in a range $\epsilon$[0.02 to 0.4] mm
d = Maximum particle size, as defined [64]]; in a range $\epsilon$[2 to 25] mm
r = Radius of the surface dimple shape [73]; in a range $\epsilon$[2 to 20] mm
t = Dimple depth, as measured from the bottom of the trough of the dimple to the middle of the segment removed from the roller surface by the dimple [74]; in a range $\epsilon$[0.05 to 0.5] mm
$\beta$ = Angle between roller and dimple centroid line and the line from the dimple centre to the point of contact; in °
$S_R$ = Roller segment length removed by the dimple; in mm
$\alpha$ = Angle between roller and dimple centroid line and the line from the point of contact to the roller centroid; Calculated in Rad, then converted to °
$\gamma$ = Geometric angle between the line connecting the contact point to the roller centroid and the line connecting the two centroids of the two rollers; °
$\theta$ = Maximum included half-angle between two tangential lines to the roller surfaces at the points of contact; °
$\mu_{needed}$ = Smallest coefficient of friction needed between the rollers and the particle; in a range $\epsilon$[0.002 to 0.35], a dimensionless quantity; and
N = nominal quantity of dimples that can be equally spaced around the radial circumference of the roller and must be an element from the integer set of numbers; in a range $\epsilon$ integers.

12. The apparatus of claim 1, wherein at least one of the rollers includes proximity scraping means in the form of at least one body defining an edge closely spaced to the circumferential surface of the roller for removing comminuted material from the surface after the material has passed through the gap.

13. The apparatus of claim 12, wherein the spacing between the edge of the scraper body and the circumferential surface of the roller is between 0.1 mm and 0.5 mm.

14. The apparatus of claim 1, further comprising cooling means for at least the circumferential surface of at least one of the rollers.

15. The apparatus of claim 1, further comprising:
a third roller, and
a passage, wherein
the third roller defines a circumferential surface and is rotatably mounted to rotate about a rotational axis; the circumferential surface of the third roller opposing the circumferential surface of one of the first and second rollers and these surfaces define between them a gap having an average size smaller than or equal to that of the gap defined between the first and second rollers, and
the passage is configured to operatively channel product that has passed through the gap between the first and second rollers into the gap defined between the third roller and one of the first and second rollers.

16. A system for processing bone product comprising:
the comminution apparatus of claim 1, and
an emulsifier.

17. The system of claim 16, wherein the emulsifier is located before or after the comminution apparatus.

18. The system of claim 17, further comprising:
a mincer before the comminution apparatus, the mincer including a conventional bone shredder configured to receive and reduce bone product to a size less than 20 mm.

* * * * *